United States Patent

Davis

[15] 3,680,639

[45] Aug. 1, 1972

[54] SPRINKLER HEAD EARTH AND GRASS CUTTER MECHANISM

[72] Inventor: William C. Davis, P.O. Box 388, Peoria, Ariz. 85345

[22] Filed: May 7, 1971

[21] Appl. No.: 141,258

[52] U.S. Cl. ...................172/15, 172/23, 172/124, 30/264
[51] Int. Cl. ..............................A01b 45/00
[58] Field of Search.............178/13, 15, 23, 25, 124; 30/DIG. 7, 276, 264

[56] References Cited

UNITED STATES PATENTS 3,028,669  4/1962  Caskey et al............172/13 UX
3,174,224  3/1965  Rousselet...................30/276 X

*Primary Examiner*—Robert E. Pulfrey
*Assistant Examiner*—Stephen C. Pellegrino
*Attorney*—Warren F. B. Lindsley

[57] ABSTRACT

A miniature power operated, rotary mowing device having an earth and grass edger for sprinkler heads and employing a simple manual operable means manipulated by an operator for quickly being rendered capable of performing the rotary mowing action or the earth and grass cutting sprinkler head action.

9 Claims, 7 Drawing Figures

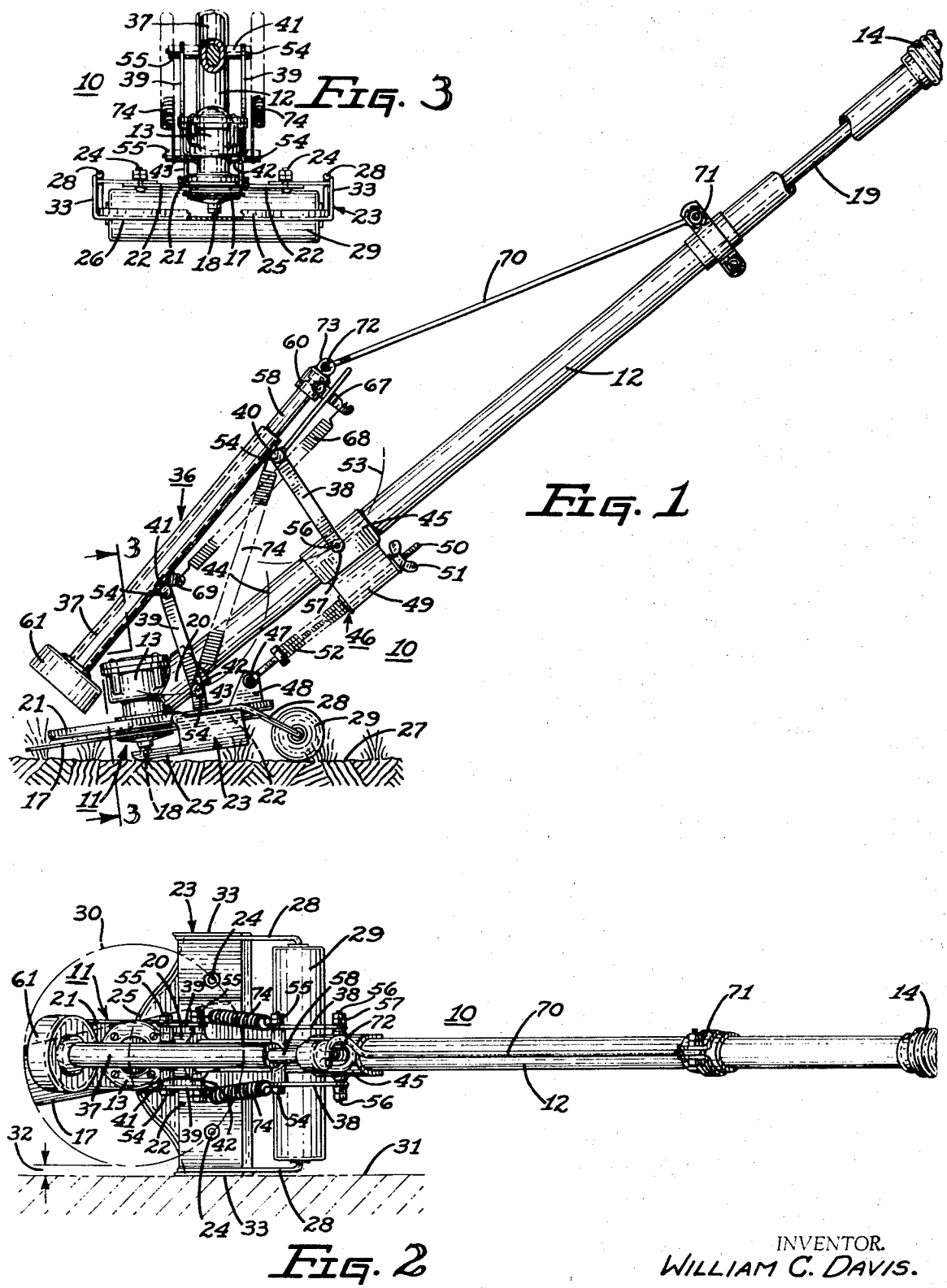

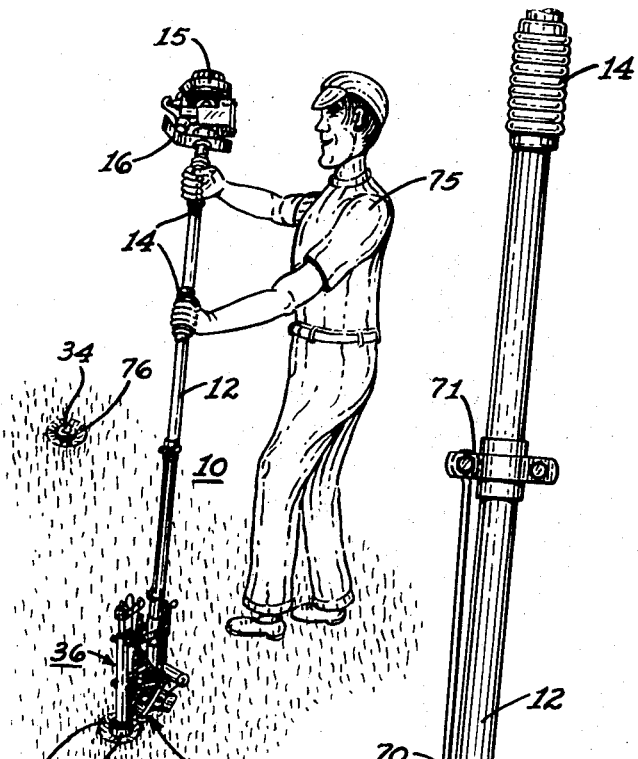
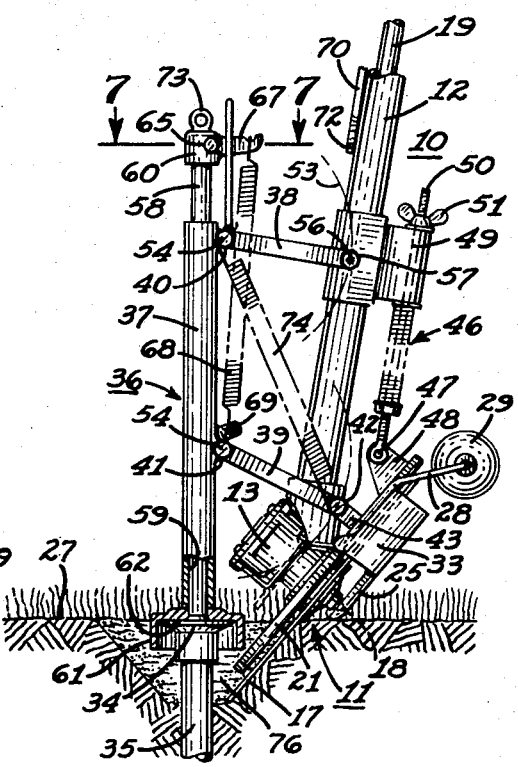
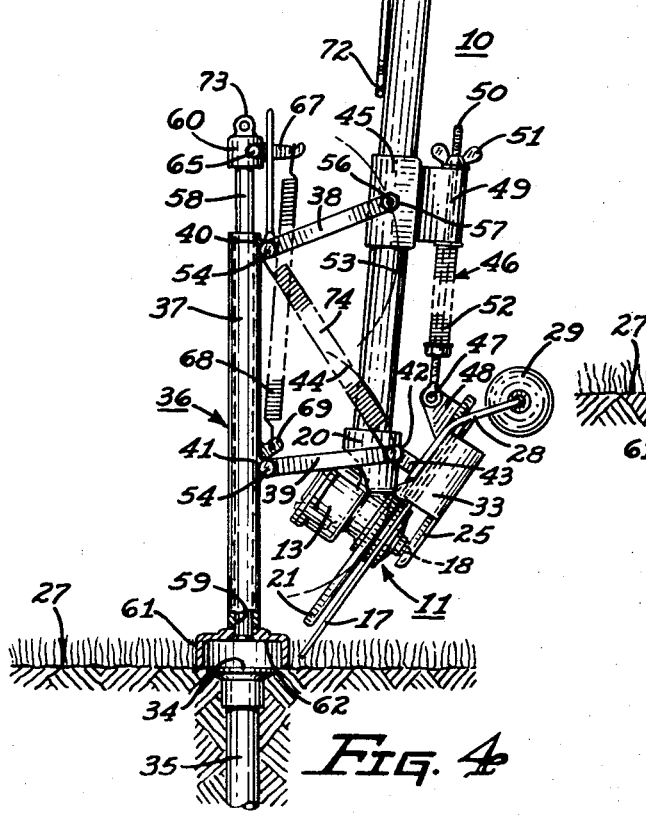

SPRINKLER HEAD EARTH AND GRASS CUTTER MECHANISM

BACKGROUND OF THE INVENTION

This invention pertains to power operated rotary mowing and edging devices.

1. Field of the Invention

This invention is particularly directed to rotary mowing devices employing an edger and trimmer for use around embedded lawn sprinkler heads.

2. Description of the Prior Art

Heretofore, trimmers have been provided which employed a vertical elongated tube having a cross head on the upper end provided with a handle. The lower end of the tube fits over a sprinkler head and is provided with an endless ring. The lower edge of the ring is provided with serrations sharpened into cutting teeth. Since this structure is hand operated, it has problems of alignment and fatigue of the operator.

In accordance with the invention claimed a new and improved power operated miniature rotary mower and sprinkler head earth and grass cutter device is provided which quickly converts from a rotary grass cutter to a usable edger and trimmer for sprinkler heads and the like with a minimum of effort.

SUMMARY OF THE INVENTION

It is, therefore, one object of this invention to provide an improved rotary hand held gardening tool.

Another object of this invention is to provide an improved mower with sprinkler head earth and grass trimming ability.

A further object of this invention is to provide a hand held wand comprising a rotary mower and sprinkler head trimmer employing a self-contained power source.

A still further object of this invention is to provide a positive drive hand held miniature rotary mower convertable quickly into a sprinkler head trimmer.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

FIG. 1 is a side elevation of the miniature mower with its earth and grass cutting attachment shown at rest in retracted position and the mower in position to cut grass.

FIG. 2 is a plan view of the mowing device shown in FIG. 1, illustrating the device cutting grass in close proximity to a wall of a building.

FIG. 3 is a front elevational view of the mowing device partly broken away and in section and taken substantially on line 3 — 3 of FIG. 1.

FIG. 4 is a side elevation of the mowing, earth and grass cutting device of FIG. 1, illustrating the respective positions of the various elements of the device when placed directly over a sprinkler head, ready for cutting and removing earth and grass from around the sprinkler head.

FIG. 5 is a fragmentary side elevation of the device shown in FIG. 4, with parts in section and broken away to illustrate the respective positions of the various elements of the device when completing the removal of earth and grass from around a sprinkler head.

FIG. 6 is a perspective view illustrating an area of lawn provided with sprinkler heads and a workman utilizing the miniature mower, earth and grass cutting device of the invention for cutting and removing earth and grass from around the sprinkler heads.

FIG. 7 is an enlarged sectional view taken on line 7 — 7 of FIG. 5 illustrating an important feature of the invention.

DESCRIPTION OF THE PREFERRED EMBODIMENT

Referring now to the various views of the drawings for a more detailed description of the construction and other features of the invention by characters of reference, FIG. 1 illustrates a manually controlled miniature mowing, earth and grass cutting machine 10 which comprises a mowing and cutting element 11 having a long tubular carrying handle or manual positioning control arm 12 extending upwardly and outwardly, in angular relation from a gear box or housing 13. Control arm 12 is provided with suitable hand grips 14, by which the operator may lift or position the mowing and cutting device as required for the particular function being performed.

The mowing and earth cutting device 10 as shown in FIG. 6 is fitted at its extreme outer end of the control arm 12 with a miniature gas engine 15 mounted above a hand guard 16 for supplying the necessary power or torque to drive and rotate a suitable cutting blade 17 of cutting element 11 through grass or earth at controlled speed to perform the desired function. The cutting blade 17 is securely attached to a short drive shaft 18 which projects downwardly from the gear housing 13 wherein it is connected by suitable gears (not shown) to a long drive shaft 19 which extends from the gear housing 13 within the center of the tubular control arm 12 to the gas engine 15, where it is connected in driving relation thereto.

It should be understood that any suitable arrangement of drive shafts, gears and propulsion means other than the gas engine shown could be used to supply the necessary rotative power to the cutting blade 17, such as an electric motor, without affecting the functions of the mowing and earth cutting device described and claimed.

Gear housing 13 and its extension 20 are securely mounted on a rigid channel plate 21 which extends front and rear of the gear housing. A transverse rigid plate 22 integral with or securely attached to plate 21 extends laterally from both sides of channel plate 21 to support a rectangular shaped frame member 23. Frame member 23 is removably secured to transverse plate member 22 by bolts and nuts 24. Frame member 23 has a semi-circular extension 25 attached to a bottom portion 26 of the frame which extends forward under drive shaft 18, thereby providing a guard for the rotating shaft to prevent it from contacting ground surface 27 when the mower is pushed or pulled thereover.

Fastened to the top outer edges of frame 23 is a pair of rearwardly extending brackets 28 having turned in ends which are adapted to support a suitable roller 29. Roller 29 extends transversely the full width of the frame or at least as wide as the circular path 30 of the cutting blade 17. Roller 29 acts as a stabilizer, to keep path 30 of the cutting blade in a plane parallel to the ground surface and also to provide a control for the height of grass cut by pivoting the mowing and cutting element 11 about the center of the roller to raise or lower the cutting blade 17 relative to the ground surface, as shown in FIG. 1.

It should be noted by referring to FIG. 2 of the drawings that the mowing and cutting element 11 is capable of cutting grass or other growth closely adjacent to building wall or fence structures 31 as indicated at 32, without damage to the structures because the end walls 33 of frame member 23 serve as guides and guards for both the rotating blade 17 and the wall of fence structures 31.

It should be understood that the function and usage of the mowing elements of this invention shown in FIGS. 1, 2 and 3 of the drawings are not limited to mowing or trimming grass or other growth in confined or hard to get at areas; but also may be utilized as a scythe for cutting tall grass, weeds and the like by simply gripping the control arm in both hands, lifting the cutting element from the ground surface and swinging the device to and fro in an arc into the growth to be cut.

FIGS. 4 through 7 of the drawings illustrate earth and grass cutting action of the invention and show the claimed structure around cylindrical objects that may be installed in a lawn such as sprinkler heads with their tops or heads 34 being flush with ground level 27 and connected to conduits or pipes 35 installed under the surface of the ground, all part of a lawn sprinkler system.

To quickly and easily perform the functions outlined above, the mowing device of this invention is provided with a detachable, locating and cutting blade positioning mechanism which is adapted to accurately center and position the cutting blade 17 in proper relation to an object such as sprinkler head 34 from around which the earth and grass is to be removed. This detachable accessory unit or mechanism is indicated generally by reference character 36, and comprises a tubular sleeve 37 which is supported by and pivotally attached to mowing and earth cutting machine 10 in a desired angular relationship by means of two pairs of links 38 and 39, respectively, which are pivotally attached at their ends to upper and lower projecting bosses 40 and 41. These bosses are integral with and project outwardly from both sides of tubular sleeve 37. The pair of lower links 39 are pivotally connected at their outer ends to bosses 42 as shown in FIG. 3 which are integral with and project from both sides of the gear housing extension 20 and also to an upstanding link 43 which is rigidly secured at its lower end to channel plate 21. This type of connection is provided to transfer any radial movement of links 39 along the arc 44 shown in FIG. 5 to change the angular relation of cutting element 11 with respect to the locating and positioning unit 36, the purpose of which will hereinafter appear.

The pair of upper links 38 are pivotally connected at their outer ends to sleeve member 45 which surrounds control arm 12 and is adapted to be slidably moved up and down on the control arm and to remain fixed in any desired adjusted position by means of an adjusting mechanism 46. Mechanism 46 is pivotally connected at its lower end 47 to bracket 48 secured to the outer end of channel plate 21 and at its upper end it is adjustably connected through an extension 49 of sleeve member 45 to control arm 12. Mechanism 46 comprises a threaded rod 50, a thumb nut 51 and a compression spring 52, as shown in FIGS. 1, 4 and 5.

This adjustable feature just described is provided to control the respective angularity between control arm 12 and positioning unit 36, when links 38 are caused to move about an arc of travel 53 at the outer ends of links 38, as shown in FIG. 4. It should be understood that links 38 and 39 could be at any desired length to vary the angularity adjustment of the cutting element 11 in relation to ground surface 27 and the positioning unit 36 so as to cut and remove earth and grass from around larger objects than sprinkler heads as shown. The pivoted ends of links 38 and 39 are journaled on suitable bolts or screws 54 which extend through drilled holes in their respective retaining bosses 40, 41 and 42 and are secured on their ends by locking nuts 55. The outer pivoted ends of links 38 are journaled on suitable studs 56, which project from both sides of the sliding sleeve member 45 and are secured by locking nuts 57 to prevent interference with the sliding action of said sleeve.

The tubular sleeve 37, to which one end of each of links 38 and 39 are pivotally connected, is provided with a central shaft 58 which is adapted to fit into bore 59 of the sleeve with slight clearance to allow free rotation of shaft 58 in the bore and to allow for free sliding action of sleeve 37 on the shaft. Shaft 58 is longer than its retaining sleeve 37 and extends from one end of the sleeve a sufficient distance to allow for the necessary sliding action of the sleeve relative to the shaft.

Secured to the upper extending end of shaft 58 is a cap member 60 which serves to limit the relative sliding movement of shaft 58 relative to sleeve 37. Securely attached to the lower end of shaft 58 is a cylindrical positioning and guide member 61 which has an open end, the inside diameter of which is slightly larger than the diameter of sprinkler head 34 from around which earth and grass is to be removed. The top inside horizontal surface 62 of guide member 61 and its connection to shaft 58 is preferably smooth and the shaft and guide member assembly is allowed to rotate or free-wheel within sleeve 37 so that any rotative motion that may be imparted to the guide member when coming into contact with the sprinkler head will not be transferred to sleeve 37. This structure prevents possible damage to the sprinkler head or unsafe torque from being applied to the machine.

To provide the free-wheeling action described above and still allow for relative sliding movement between shaft 58 and sleeve 37 cap member 60 is connected to shaft 58 by means comprising a semi-circular circumferential groove 63 formed in shaft 58 which is in alignment with a drilled hole 64 extending through cap member 60, bolt 65 having a radius which is slightly less than the radius of the semi-circular section of groove 63 passes through hole 64 and groove 63 and is secured therein by lock nuts 66. This method of attachment of the cap member to shaft 58 allows the shaft to rotate freely in sleeve 37.

Cap member 60 is also provided with a rearwardly extending arm 67 having a depression adjacent its outer end which is adapted to receive and support one end of a tension spring 68. The other end of spring 68 is securely attached to a rearwardly projecting tab 69 formed integral with sleeve 37. This tension spring exerts longitudinal force on the assembly of cap member 60, shaft 58 and guide member 61 relative to sleeve 37 and its associated parts, such as the links 38 and 39, when these elements are in their inactive position shown in FIG. 1. These elements are retained in this inactive position when mowing element 11 is in use by a holding rod 70. Rod 70 is pivotally secured at its upper end by a clamp 71 to control arm 12 and at its lower hook end 72 by an eye 73 formed in an ear of cap 60. The cutting element 11 and the locating and positioning unit 36 are also retained in their respective positions shown in FIG. 1 by means of a pair of tension springs 74, the upper ends of which are journaled on bolts 54 which extend through bosses 40, and the lower ends of which are journaled on other bolts 54 which extend through bosses 42 on gear housing extension 20. Further usage and functions of the aforementioned tension springs will be evident from the following paragraphs which describe the operation and function of the mowing and earth cutting machine of this invention, when being used to remove earth and grass from around sprinkler heads or the like.

OPERATION

The operator or workman 75 preferably stops the engine 15 for safety reasons, removes the hooked end 72 of the holding rod 70 and from the eye 73 in an ear of cap member 60, thereby relieving some of the tension of spring 68 and allowing the spring to pull cap 60 and shaft 58 to which it is attached and the tubular sleeve 37 together. This causes guide member 61 and shaft 58 to move downwardly out from the bottom end of sleeve 37.

The workman then restarts the engine and lifts the entire machine from the ground surface and locates the guide member 61 directly over the center of sprinkler head 34, with the open end of the guide member resting on ground surface 27 and with sleeve 37 of the locating and positioning unit 36 extending above and perpendicular to the center of the sprinkler head. The operator then proceeds to apply downward pressure to control arm 12 which is held with both hands as shown in FIG. 6, thereby lowering sleeve 37 of positioning unit 36 into contact with the top surface of guide member 61, and at the same time allowing tension springs 74 to rotate links 38 and 39 about arcs 44 and 53, thereby moving the cutting element 11 up and out from possible contact with the guide member 61 and positioning the elements of the machine as shown in FIG. 4. The machine is now ready to begin the grass cutting and earth removing operation from around the sprinkler head.

The workman checks to be sure the positioning unit 36 is directly over and perpendicular to the sprinkler head. He then proceeds to exert additional downward pressure on the control arm 12 thereby lowering the cutting element 11 and the rotating blade 17 into contact with the ground surface 27 by slowly moving the links 38 and 39 against the pull of tension spring 74, downwardly along the path of their arcs 44 and 53. The workman then continues to exert downward pressure on control arm 12 and proceeds to slowly walk in a circular path around the sprinkler head, causing blade 17 of cutting element 11 to cut and throw out earth and grass from around the sprinkler head resulting in the formation of a clean conical shaped depression 76 surrounding each sprinkler head operated on.

It should be noted that the above described operation presents no danger of damage to the below ground pipes of the sprinkler system because the approach of the cutting blade 17 to pipe 35 can be accurately controlled by adjusting mechanism 46 which controls and holds sleeve member 45 and hence limits the travel of links 38 and 39 with respect to their pivot points, about their arcs 53 and 44. When the workman has completed this operation, he merely lifts the machine from the formed depression and the tension springs then return the various elements to the position shown in FIG. 4 ready for another such operation. If the workman desires to use the machine for a mowing operation he merely pulls out shaft 58 against the tension of spring 68 and 74 and replaces the hooked end 72 of the holding rod 70 in eye 73 and the machine is again ready to resume mowing operations in the position shown in FIG. 1.

Although but one embodiment of the invention has been shown and described it will be apparent to those skilled in the art that various changes and modifications may be made therein without departing from the spirit of the invention or from the scope of the appended claims.

I claim:
1. A power tool comprising in combination:
   a hand held first shaft,
   a rotary cutting blade pivotally mounted on said first shaft at one end thereof,
   means mounted on said first shaft for rotating said cutting blade,
   lever means pivotally mounted at one end thereof on said first shaft,
   a hollow elongated cylindrical member pivotally mounted on the other end of said lever means for movement longitudinally of said first shaft,
   a second shaft slidably mounted in said cylindrical member,
   an orienting cup having an inside diameter for receiving ground mounted items mounted at an end of said second shaft common with said one end of said first shaft,
   means mounted on said tool for biasing said second shaft and said cup outwardly of said cylindrical member,
   said first shaft when actuated longitudinally of said cylindrical member when said cup has engaged a ground mounted item causing said cutting blade to move angularly relative to said cup at an acute angle with said second shaft.

2. The power tool set forth in claim 1 wherein said biasing means for said second shaft is mounted between said other end of said second shaft and said cylindrical member.

3. The power tool set forth in claim 1 in further combination with means mounted on said first shaft for adjustably positioning said cutting blade in one of a plurality of positions in angular relationship to said first shaft.

4. The power tool set forth in claim 1 in further combination with means for mounting said cutting blade so that the plane of its blade forms an acute angle with the longitudinal axis of said second shaft.

5. The power tool set forth in claim 1 wherein said lever means is of sufficient length to cause said first shaft and said cylindrical member to be separated a sufficient distance to cause said cutting blade when moved angularly relative said cup to pass under said cup a predetermined distance.

6. The power tool set forth in claim 1 wherein said lever means comprises a pair of spaced levers, one of said levers being fixedly attached at one end to said first shaft and the other of said levers being attached at one end to a collar slidably positioned on said first shaft, said collar's position on said first shaft fixing the angular position of said cutting blade with said second shaft.

7. The power tool set forth in claim 1 in further combination with:
  a housing attached to said first shaft for surrounding said cutting blade on its top and sides and exposing said cutting blade at its lower surface,
  a roller mounted on said housing in suitable bearings for ground engagement at which time said cutter blade assumes a parallel relationship with the ground at a given height above it, and
  means attached between said second shaft and said first shaft for retracting said cylindrical member and said second shaft longitudinally of said first shaft away from said cutting blade to permit said cutting blade and roller to operate as a mower.

8. The power tool set forth in claim 1 in further combination with means attached between said second shaft and said first shaft for retracting said cylindrical member and said second shaft longitudinally of said first shaft away from said cutting blade and holding them in said retracted position.

9. The power tool set forth in claim 1 wherein said means mounted on said first shaft for rotating said cutting blade comprises a gasoline engine.

* * * * *